Sept. 22, 1970     E. J. JOHNSTON ET AL     3,529,411
SIDE DELIVERY RAKE
Filed Nov. 18, 1968     3 Sheets-Sheet 2
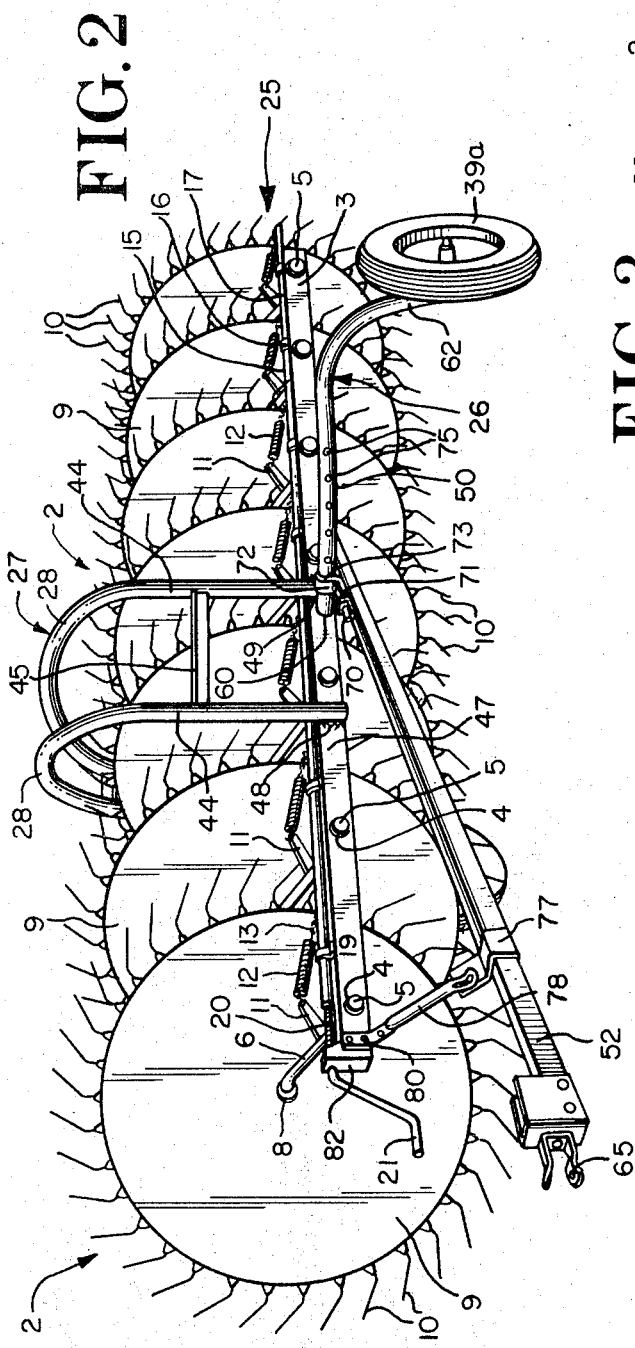
Inventors
Edward J. Johnston
N. Donald Patterson
Frank J. Macha, Jr.
John J. Kowalik
Attorney Inventors
Edward J. Johnston
N. Donald Patterson
Frank J. Macha, Jr.

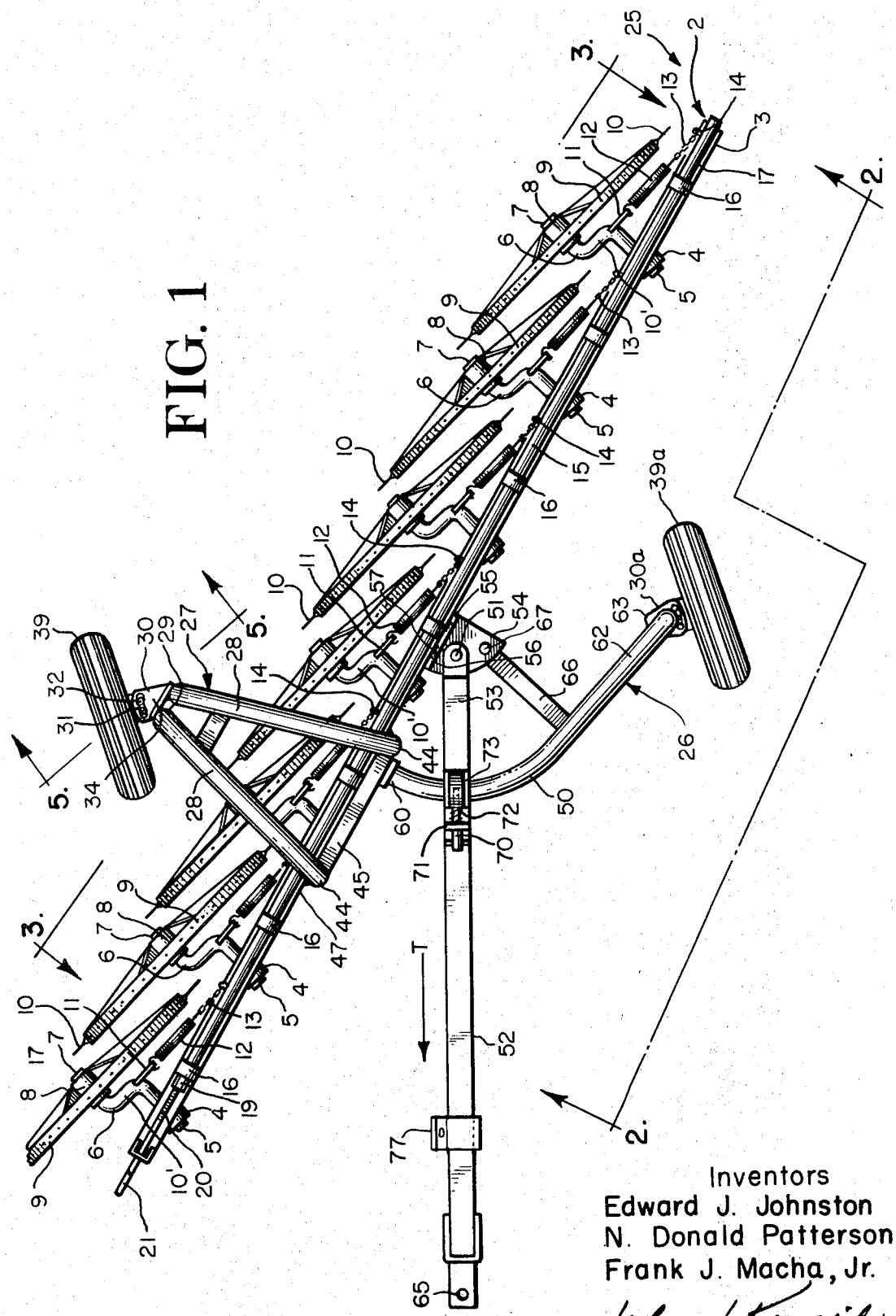

John J. Kowalik
Attorney

United States Patent Office 3,529,411
Patented Sept. 22, 1970

3,529,411
SIDE DELIVERY RAKE
Edward J. Johnston, La Grange, N. Donald Patterson, Downers Grove, and Frank J. Macha, Jr., Lockport, Ill., assignors to International Harvester Company, Chicago, Ill., a corporation of Delaware
Filed Nov. 18, 1968, Ser. No. 776,601
Int. Cl. A01d 77/06
U.S. Cl. 56—377                                9 Claims

ABSTRACT OF THE DISCLOSURE

A side delivery rake having a straight main frame member with a plurality of crank supported raking wheels behind the main frame member, a rear frame structure extending from intermediate the ends of the main frame member from its forward side over the raking wheels and to a point therebehind, a front laterally projecting frame member having an intermediate portion formed as a guide and support for a draft tongue which is pivoted at its rear end to an anchor structure connected to the main frame member, the front end of the front frame portion and the rear end of the rear frame portion mounting supporting wheels thereon.

---

A companion application Ser. No. 9,257, now Pat. D.213,061, filed Nov. 2, 1967 for design is copending herewith.

DISCUSSION OF THE PRIOR ART

In prior art structures a complicated frame assembly is usually provided which is expensive and cumbersome or which has the wheel supporting frames between the rake wheels so that the spacing therebetween is not uniform and in some the crop condition is the cause of poor raking because of the lack of adequate overlap of the wheels. Further, the frame structure usually is of a rigid construction such that rake wheels themselves must rely on spring mountings to float. However, even in such structures the entire rake is being continuously bounced in the field which subjects the supporting frame to continuous peak stresses. This requires that the frame members be of thick sections to resist such peak loads wherefor the construction is expensive and heavy.

The present invention is directed to a side delivery rake of the wheel type wherein the frame provides resilient support for the rake wheel-carrying member and wherein the parts are arranged in a coordinated structurally complemental arrangement.

A general object of the invention is to provide a novel rake wherein the rake comprises a straight main frame section which supports the raking wheels and wherein the supporting frame comprises fore and aft members connected to the main frame each of these members carrying a support wheel and the aft member being comprised of a pair of elements in the form of an arch, said elements converging rearwardly and downwardly and merging into and connected with a wheel mounting means and the forward lower ends of these elements being connected to the frame beam member at laterally spaced areas to resist lateral deflection of the aft member to hold the wheel thereon in line with the intended direction of travel.

A further object of the invention is to provide a frame structure wherein the forward element of the frame structure has an arcuate section serving as a guide and support for a draft tongue, the rear end of which is pivoted to the main frame member and the tongue intermediately carrying a latch which is cooperative with a series of apertures in the front frame member for connecting the tongue in a series of angularly displaced positions to regulate the raking width of the rake or for disposing the same in transport position.

Figure 4:
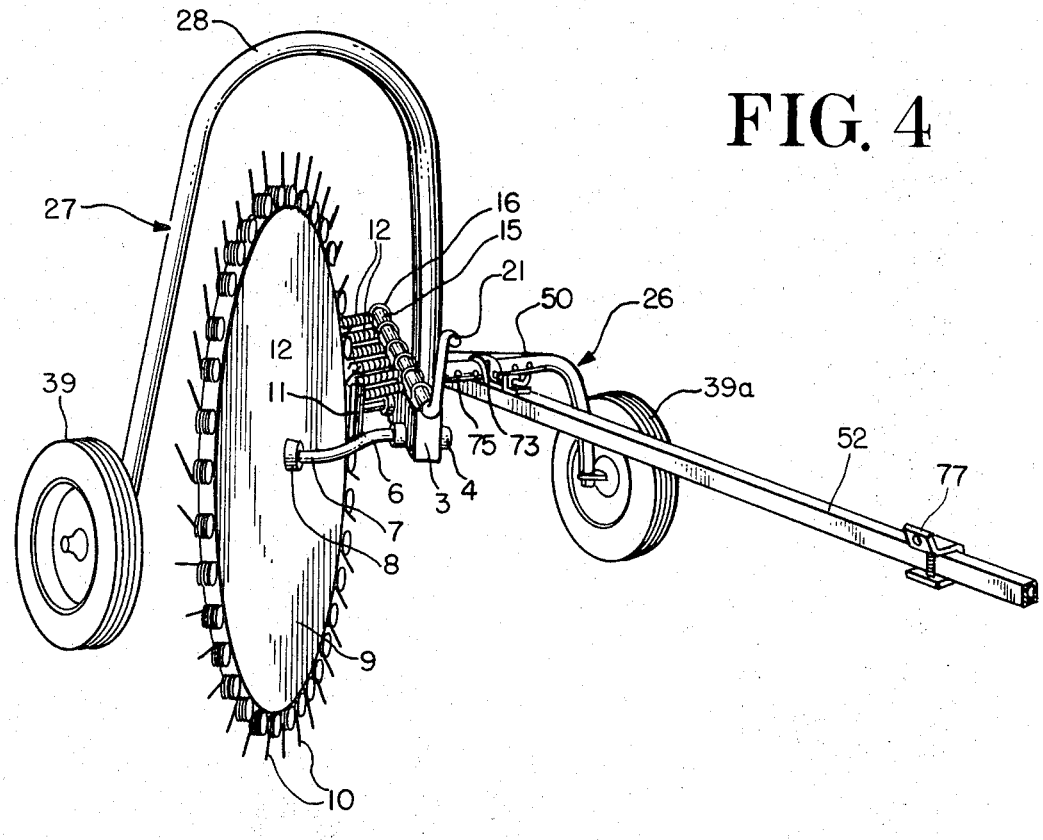
Figure 5:
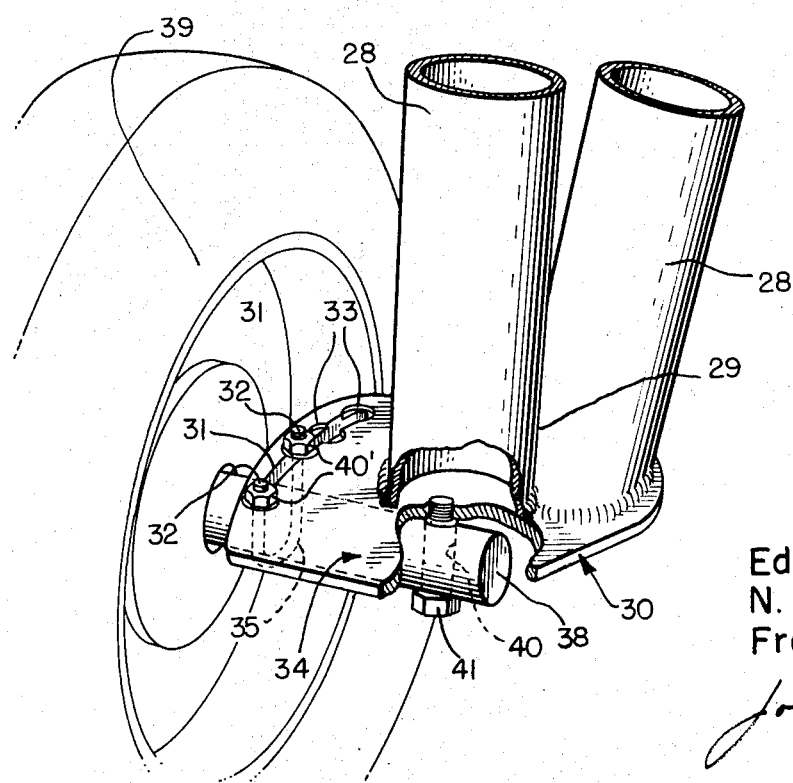

These and other objects of the invention become more readily apparent from the specification and the drawings, wherein:

FIG. 1 is a plan view of a rake incorporating the invention;
FIG. 2 is a front view thereof showing the rake in transport position;
FIG. 3 is a rear elevational view thereof;
FIG. 4 is an end elevational view; and
FIG. 5 is an enlarged perspective view taken substantially on line 5—5 of FIG. 1.

Describing the invention in detail and having particular reference to the drawings there is shown a side delivery rake generally designated 2 which comprises a straight main beam member 3 which may be of box section, the beam member extending oblique to the direction of travel of the rake as shown by the arrow T (FIG. 1) and being provided at regularly spaced intervals with fore and aft generally horizontally disposed bearings 4 each of which admits the forward end portion 5 of a crank axle 6. The offset rear end portion 7 of the crank is journaled to the hub 8 of a wheel 9 which peripherally mounts a plurality of raking tines 10, 10 such as is well known to those skilled in the art.

Each crank is provided on the throw portion 10′ thereof with an upstanding arm 11 which hooks to one end of a spring 12, the other end of which is adjustably connected through a link chain 13 to an eye 14 which is mounted on a slidable tube 15 which is guided through the sockets or bearings 16 connected with the top side 17 of the main beam 3. Tube 15 has a threaded nut 19 at one end receiving a threaded shank portion 20 of crank type adjusting screw 21 whereby pursuant to rotation of the screw the tube 15 is extended or retracted by concomitantly retracting or advancing the tube to impose greater or lesser tension on the springs 12, it being observed that in the maximum extended position all the wheels are raised to transport position by pivoting about the front portions 5 of the respective cranks. It will be noted that all the adjacent wheels are overlapped uniformly and that each preceding wheel will turn pursuant to engagement of the tines with the stubble or the ground and rake the cut material such as hay and each wheel will kick to the succeeding rearward wheel in the eschelon formation until the material discharges at the discharge end 25.

The main beam member is mounted on and supported from front and rear beam structure 26, 27. The rear frame structure is comprised of an arch frame assembly 27 which includes a pair of beam members 28, 28 which converge downwardly and rearwardly into an apex 29 and connect to a rear mount 30. The rear mount incorporates a bracket 34 having an arcuate slot 31 which is adapted to receive the ends 32 of a U bolt 35 which straddles an axle 38 rotatably mounting a wheel 39. The axle 38 has an aperture 40 pivoted on a vertically depending spindle 41 from the bracket portion 31. Nuts 40′, 40′ secure the axle 38 to bracket 30 in selected indents 33.

The front leg portions 44, 44 of the arch structure 27 extend downwardly and intermediate their ends are interconnected by a brace 45 and at their lower ends are connected to the front side 47 of the main beam member 3 as by welding at 48 and 49 at laterally spaced points thereon intermediate the ends of the beam member 3.

Front beam member 26 has an upper generally horizontal arcuate portion 50 which is concentric with the axis of pivot 51 of the draft tongue 52, the pivot 51 being between the rear end portion 53 of the draft element via a vertical bolt assembly 51 to a generally horizontal bracket extension 54 of a mounting bracket 55 which has a vertical flange 56 preferably weld-connected as at 57 to the front side 47 of the beam member 3. The rear end 60 of the horizontal upper portion 50 of the front beam member 26 is connected to the front side of beam member 3 adjacent to its connection with one of the legs 28 of the rear beam structure. Member 26 extends laterally with respect to the direction of travel of the rake as shown by the arrow T. The forward end of the portion 50 curvingly emerges into a downwardly extending leg portion 62 which at its lower end is provided with a bracket 63 connected to a mounting structure 30a which is identical with the structure 30 of the rear wheel 39 and mounts a wheel 39a which is adjustable about a vertical axis secured in place by means of a U bolt assembly similar to that previously described in connection with the mounting of wheel 39.

The position of the wheels 39, 39a is adjusted to be consistent with and generally parallel to the position of the longitudinal axis of the draft element 52 which at its forward end is provided with a pin receiving aperture 65 by means of which the hitch portion is connected to an associated tractor hitch.

The portion 50 of the forward frame element 26 is connected adjacent to the juncture of the portions 50, 62 with the forward end of a rearwardly projecting brace 66 which at its rear end is connected as at 67 to the bracket portion 54.

The draft tongue 65 is provided with a spring loaded bolt 70 which extends through a guide 71 and projects through an aperture 72 in a sleeve 73 and into any one of a series of laterally spaced openings 75 which are provided in the front side of the portion 50. Sleeve 73 is connected to tongue 52 and provides a slidable support for the draft member 52 and the bolt 70 together with the apertures 75 provides a latching arrangement for disposing the draft element 52 in operating position which is shown in FIG. 1 or in transport position such as shown in FIG. 2 wherein the draft element 52 is provided adjacent to its forward end with a bracket 77 which is adapted to be secured to a hanger 78, the hanger being mounted as at 80 to the forward side of the main beam member 3 adjacent to its forward end 82.

The instant unit has been extensively tested and has been found to operate successfully and particularly the arrangement of the arch frame structure together with the frame arrangement 26 in combination with the tongue element 52 and the positioning in placement of the beam member 3 and its support of the wheels contributed to provide a resilient arrangement which obtains excellent raking action and the frame elements are so arranged that they do not interfere with the raking operation and obtain a simple and efficient structure accommodating uniform spacing of the rake wheels.

What is claimed is:

1. A side delivery rake having an obliquely disposed main frame member, wheel supported front and rear frame structures connected to the main frame member, rake wheels mounted on said main frame member, a draft element extending forwardly from the main frame member and having a rear end, means pivotally connecting the rear end of the draft element with the main frame member intermediate the ends of the latter, and said rear frame structure comprising a pair of arch members having forward ends connected to said main frame member and extending over the rake wheels and converging to an apex behind said main frame member.

2. The invention according to claim 1 and ground wheels mounted on the ends of said front and rear frame structures and spaced transversely, and the wheel on the front frame structure being axially offset forwardly of the wheel on the rear frame structure.

3. The invention according to claim 1 and a ground wheel assembly secured to said arch members at the apex thereof behind said rake wheels, and said arch members having said forward ends connected at spaced points to said main frame and conjunctively with the apex serving to stabilize the ground wheel against lateral deflection.

4. The invention according to claim 3 and said arch members being of tubular form and of small diameter and relatively thin section.

5. The invention according to claim 4 and said front frame structure being a one-piece tube and having an arcuate portion a laterally extending ground-wheel-mounting leg curved downwardly from said arcuate portion which is substantially horizontally disposed.

6. The invention according to claim 5 and a brace extending from said arcuate portion adjacent to said leg and having a rear end adjacent to said main beam, and means connecting the rear end of the brace to said main beam.

7. The invention according to claim 1 and a longitudinal adjusting element slidably secured on said main beam and means for incrementally adjusting the position of the adjusting element in either direction lengthwise thereof, and means including spring means connecting each wheel to said adjusting element for adjustment thereby.

8. The invention according to claim 6 and the ground wheels being disposed at opposite sides of the median point of said main beam.

9. The invention according to claim 2 and means adjustably maintaining the ground wheels about vertical axes, for disposing the same generally parallel with the draft element.

References Cited

UNITED STATES PATENTS

| | | | |
|---|---|---|---|
| 2,844,935 | 7/1958 | Cooley | 56—377 |
| 3,320,735 | 5/1967 | Sutherland et al. | 56—377 |
| 3,389,544 | 6/1968 | Wood | 56—377 |
| 3,484,803 | 12/1969 | Breed et al. | 56—377 |

RUSSELL R. KINSEY, Primary Examiner